United States Patent

Vitovsky

[15] 3,643,493
[45] Feb. 22, 1972

[54] MEASURING SPECIFIC SURFACE OF POWDERS

[72] Inventor: Jan Vitovsky, Brno, Czechoslovakia

[73] Assignee: Vyzkumny ustav Stavebnich hmot, Brno, Czechoslovakia

[22] Filed: Mar. 27, 1970

[21] Appl. No.: 23,406

[30] Foreign Application Priority Data

Mar. 31, 1969 Czechoslovakia...................2278/69

[52] U.S. Cl. .............................73/38, 73/432 R, 73/432 PS
[51] Int. Cl. ..........................................................G01n 15/08
[58] Field of Search...........................................73/432 R, 38

[56] References Cited

UNITED STATES PATENTS

| | | | |
|---|---|---|---|
| 2,392,637 | 1/1946 | Boehler | 73/38 |
| 1,481,952 | 1/1924 | Bachrach | 73/401 |
| 2,943,478 | 7/1960 | Brabender | 73/422 |
| 3,039,293 | 6/1962 | Reddick | 73/38 |

*Primary Examiner*—S. Clement Swisher
*Attorney*—Richard Low and Murray Schaffer

[57] ABSTRACT

Method and apparatus for measuring the specific surface of pulverized materials successively feeding a predetermined weight of pulverized material to a transparent container. The material is then compacted into a predetermined volume and air passed therethrough, the air being increased from an initial pressure to a predetermined increased pressure. The pressure is then allowed to decrease to its initial position and the time taken is measured against a fixed reference. The process is cyclically and repetitively operated.

9 Claims, 1 Drawing Figure

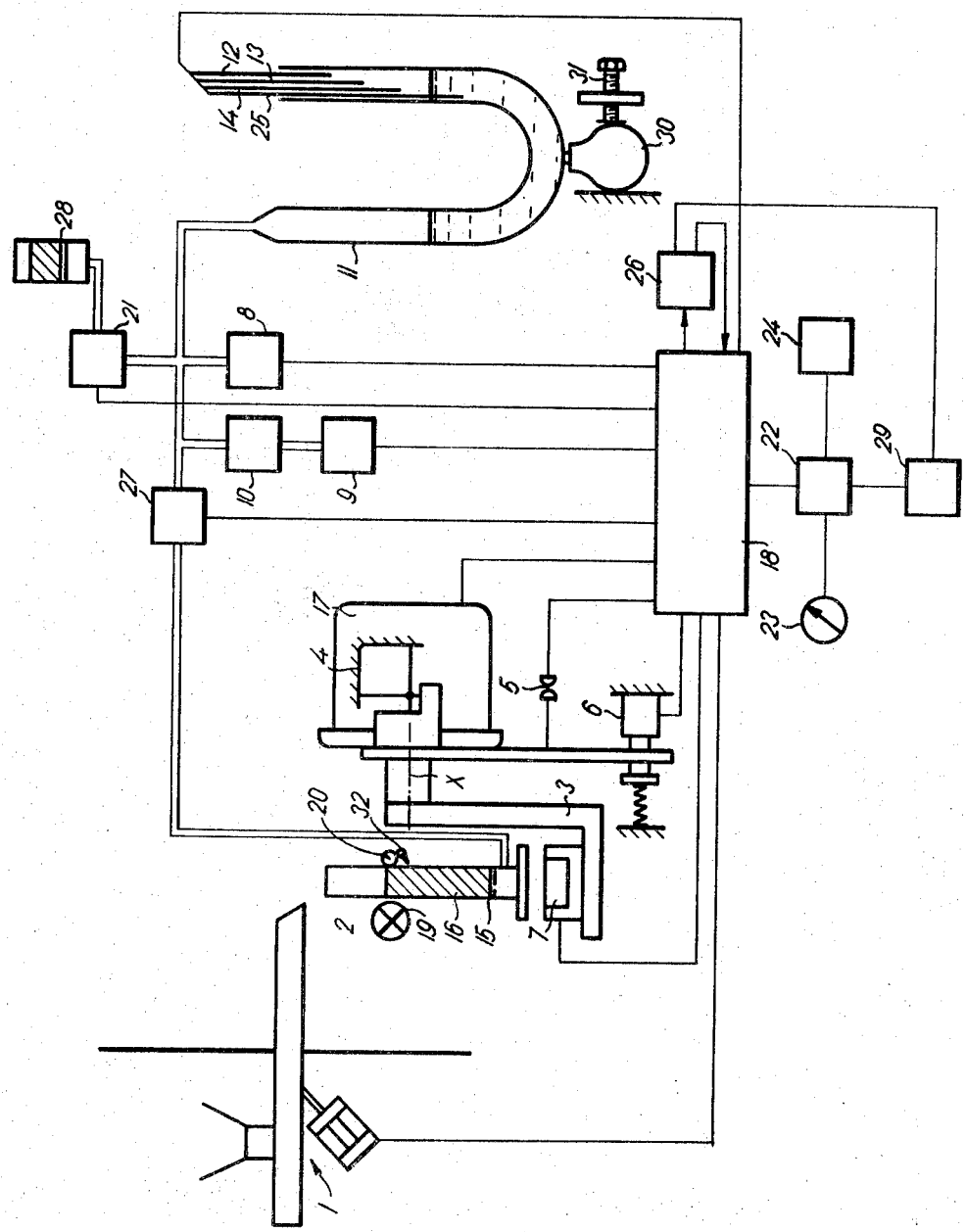

MEASURING SPECIFIC SURFACE OF POWDERS

BACKGROUND OF INVENTION

The present invention relates to the production of cement and in particular to a method and an apparatus measuring the specific surface of pulverized or powdered raw materials.

The proper grinding of aggregate material is a very important step in the production of cement since its compressive strength, especially in the initial stages of formation depends largely upon the fineness of the ground raw material. An unnecessarily high degree of fineness results in increased consumption without any improvement of cement quality while too low a degree of pulverization produces a poor cement.

The conventional procedure for measuring the specific surface or particle size is carried out with laboratory equipment and involves the manual taking of a sample, weighing it by hand and then compressing it by a piston to a predetermined weight and volume. Air is then manually pumped through the sample to a desired pressure and the rate at which the air pressure decreases thereafter is measured by visual means and a common stopwatch. This process effectively measures the ratio between the surface area of the particles and a fixed volume. Nevertheless such a procedure is only adaptable to the batch testing and is consequently uneconomic particularly for large and continuously running mills.

Because of the particle sizes involved it is advantageous to employ the air permeability, or porosity technique by which the specific surface, or density of the material can be measured. It has however, not been successfully adapted to continuous straight through operating mills.

Attempts have been made to automate the system by the use of electronic control means, sensor devices and the like. These attempts have been largely unsuccessful because such means are highly unreliable in heavy grinding operations being subject to the harmful effects of dust, rough handling etc.

It is therefore the object of the present invention to provide a method and apparatus for the continuous testing and measurement of pulverized or powdered material.

It is another object of the present invention to provide an improved method for the manufacture of concrete.

It is the object of the present invention to provide improved apparatus for the continuous testing and measurement of pulverized material for the production of cement.

It is a further object of the present invention to provide an improved apparatus for measuring the specific surface of pulverized materials by the air permeability technique.

SUMMARY OF INVENTION

According to the present invention the method comprises the steps of successively feeding a predetermined weight of pulverized material to a transparent container. The material is then compacted into a predetermined volume and air passed therethrough, the air being increased from an initial pressure to a predetermined increased pressure. The pressure is then allowed to decrease to its initial position and the time taken is measured against a fixed reference. The process is cyclically and repetitively operated.

In the preferred form the invention is embodied in apparatus comprising a transparent tube which is mounted on suitable weighing device, and provided with means for vibration whereby a predetermined weight and volume of material is obtained. The air is supplied by a pump, continuously to both the tube and a pressure sensing device until a predetermined level of pressure is obtained. Thereafter the air is stopped and the time for the pressure to decrease is measured.

Also in the preferred form means are provided for successively filling and emptying the tube to effect cyclic operation, to calibrate the system, and to record the time measurements.

The following disclosure contains a full and complete description of one embodiment of the present invention, which illustrates its function as well as structure. The earlier mentioned objects and advantages will also be apparent.

BRIEF DESCRIPTION OF THE DRAWING

In the disclosure reference is made to the accompanying drawing in which the sole FIGURE shows schematically the preferred embodiment of the inventive apparatus.

DESCRIPTION OF INVENTION

Referring to this accompanying drawing, the apparatus comprises a vibratory feeder 1 adapted to transport a sample of powder from a hopper mill aggregate into a transparent measuring tube 2 provided at its lower end with a porous plate 15 spaced from the bottom. The tube 2 is further provided at a predetermined height above the plate 15 with a pendulum wiper device 32, a level sensor comprising a light source 19 and an arranged photoelectric cell 20. The transparent measuring tube 2 is itself mounted on a vibrator 7 which is rigidly fixed to a scale comprising a swingable arm 3 attached to the shaft of a reversible electric motor 17. The transparent measuring tube 2 and the motor 17 are suspended from a suitable frame at a point 4 to form a swingable balance beam. A solenoid 6 having an extendible arm and a switch 5 having needle contacts are provided to allow adjustment of the tube and motor balance.

The apparatus further comprises a pressure-sensitive transducer consisting of a tube 11 such a a manometer filled with a liquid having connected to it through its lower end to a small flexible or rubber balloon 30 the expansion of which is controlled by a screw means 31. In one of the arms of the U-tube 11, at various points above the liquid level, there is provided three electrodes 12, 13 and 14. A common electrode 25 is also provided which normally extends into the liquid. The other arm of the U-tube 11 is connected by a conduit to the space under the porous plate 15 of the transparent measuring tube 2. An electromagnetically operated valve 27 is interposed between the U-tube 11 and the vibrating tube 2.

Between the second arm of the U-tube 11 and the solenoid valve 27 there is interposed a source of air from a pump 9, via a back pressure regulating valve 10. Bridging the conduit ahead of the valve 27 are still a third and fourth solenoid valves 8 and 21 the latter of which is connected to standard reference sample 28 contained in a tube similar to that of the transparent tube 2.

A relay, computer or similar control unit 18 is connected directly with the vibratory feeder 1, the vibrator 7, the balance solenoid 6, the switch 5, the electromotor 17, the solenoid valve 27, the pump 9, the solenoid valves 8 and 21, and with the electrodes 12, 13 and 14 and the common electrode 25. The control unit is provided with a cycle counter 26 having a pair of outlets, via an electronic timer 22 with an indicator 23, a time recording means 24 and a correction element 29 the inlet of which is connected to the first outlet of the cycle counter 26. The inlet and second outlet of the cycle counter 26 being respectively connected to the control unit 18 as indicated in the drawing.

The apparatus thus described operates as follows:

The material to be tested 16, is fed by the vibratory feeder 1 from the hopper of the mill, into the transparent measuring tube 2, which together with the arm 3, the vibrator 7, and the electromotor 17 form a weigh beam swingable about the suspension point 4.

As soon as the weight of the sample material reaches a predetermined value, the needle contacts of switch 5 stop the vibratory feeder 1, and switch on the balance solenoid 6. The balance solenoid 6 acts to counter the movement of the beam and swings the tube 2 back into a vertical position. Simultaneously the vibrator 7 is activated causing compacting of the sample in the tube 2. The vibrations continue until the sample level in the transparent measuring tube 2 drops so that a light beam from the light source 19 impinges onto the photoelectric cell 20. In this manner a predetermined weight of powder may be compacted into a predetermined volume. When this condition is reached the third and fourth solenoid valves 8 and 21 are closed, and the pump 9 is put into operation, pumping the air into the space in tube 2 beneath the sample to be tested and into the upper end of the U-tube 11, until a pressure forces the liquid in tube 11 to contact the highest measuring electrode 12.

The air thus pumped into the system penetrates through the porous plate 15 and through the tested sample 16 to the atmosphere lower simultaneously the pressure in the U-tube 11. The rate of decrease of the air pressure is dependent upon the specific surface of the tested sample. The bigger the specific surface, the smaller is the rate of decrease of the air pressure. The time interval, as measured by the electronic timer 22, which is needed for the drop in pressure in the U-tube 11 from the value corresponding to the electrode 12 to the value corresponding to the electrode 14, is the output variable of the apparatus. The time is measured by means of the electronic timer 22 which is provided with a time recording means 24 to avoid a zero value of the output signal. The output signal serves as an inlet variable for feed back the regulation of the system. The electronic timer 22 is also adapted to be connected to the indicator 23 as well as the recording means 24. The common electrode 25 makes a common second pole for the measuring electrodes 12, 13 and 14.

When the pressure decreases to a point corresponding to the position of the electrode 14, the electronic timer 22 is stopped and the electromotor 17 turns the arm 3 with the transparent measuring tube 2 through 180° about the axis X. In this position the vibration of the electromagnetic vibrator 7 causes the sample to be poured out of the tube 2. When the tube 2 is empty the 17 is reversed turning the swingable arm to its starting position. After this starting position is reached the balance solenoid 6 is switched off so that the arm 3 is freed and released so that the next sample can be weighed after delivery to the tube 2.

Before the next measuring cycle starts, the measuring decade of the electronic timer 22 is automatically reset. The outlet signal of the previous cycle remains recorded in the indicator 23 until the next measuring cycle is finished, after which the indicator is turned without any resetting directly to the reading of the new measurement. The cycle counter 26 counts and records the number of all finished measuring cycles and permits, when the predetermined number of cycles are achieved, correction of the apparatus.

Periodically, because of evaporation of liquid, effects of vibration on the various parts or other factors, the apparatus must be calibrated or corrected. This is accomplished as follows:

The vibratory feeder 1 is not put into operation but the pump 9 is switched on and, simultaneously, the solenoid valve 8 and the solenoid valve 27 are closed. The valve 21 on the other hand remains in open position and the air pumped by the pump 9 lifts the liquid level in the contact U-tube 11 up to the electrode 12. Then the pump 9 is switched off, and the air passes via the solenoid valve 21 and the reference sample 28 (or an equivalent capillary tube with the same pneumatic resistance as the reference sample 28) into the atmosphere. The measuring of the reference sample 28 has a predetermined known time. If the measured time differs (e.g., due to the influence of temperature) from the predetermined known time, a correction element 29 is carried out, wherein a zero set of the electronic timer 22 is shifted in a position or negative sense till the value of the measured time and the value of the known time are the same. Thus the zero set of the electronic timer 22 is kept in an adjusted state till the next correction.

The walls of the transparent measuring tube 2 are cleaned twice in each cycle by the pendulum wiping device 32 which is turned over for the first time when the arm 3 swings up to the position for emptying and for the second time when the arm 3 swings back to its initial position. Thus the light from source 19 reaches the photo cell 20 without distortion.

The exact setting of the liquid level (the liquid evaporates) in the contact U-tube 11 is obtained by the liquid stored in the small rubber balloon 30, which is connected with the interior of the U-tube 11. The screw means 31 is placed in such a position that a volume of the rubber balloon 31 can be changed in positive or negative direction so that, the liquid level in the U-tube 11 can be set exactly as required.

It will thus be seen that the apparatus according to the invention uses wear resistant elements, the evaluating elements being constructed of semiconductors which have practically unrestricted service life. Its advantages include regular correction cycle, automatic cleaning of the light inlet portion of the photoelectric cell, compacting of the measured sample by vibration, very simple and easy maintenance, and adjustable liquid level in the contact U-tube, which enable the specific surface of powder substances to be measured automatically in regular cycles.

Various modifications can be made, such as in the structure for mounting the tube, or for the pressure indicator or sensing tube. For example, any weighing means, vibratory means may be employed in place of the balance beam and reversible motor. A simple dashpot or cylinder arrangement can replace the U-shaped tube. The various regulation means such as the rubber balloon and the solenoid control for the balance beam are also schematically shown. As a consequence it will be appreciated that the present disclosure is illustrative only and should not be taken as limiting of the scope of the invention described.

What is claimed is:

1. Apparatus for the measurement of the specific surface of pulverized material, comprising a container, means for feeding a predetermined weight of pulverized material to said container, means for vibrating said container to cause said material in said container into a compacter predetermined volume, means for passing air through said compacted material at an increasing pressure, means for sensing the pressure of said air and for stopping the flow thereof when it reaches a predetermined level, and means for measuring the time said air decreases in pressure from said predetermined level.

2. Apparatus for the measurement of the specific surface of pulverized material, comprising a container, means for feeding a predetermined weight of pulverized material to said container, means for passing air through said compacted material at an increasing pressure, means for sensing the pressure of said air and for stopping the flow thereof when it reaches a predetermined level, and means for measuring the time said air decreases in pressure from said predetermined level, said container being mounted on a scale, and being provided with level sensing means for determining a fixed level of material contained therein, means for vibrating said container, said vibrating means being responsive to said signal means whereby said container is vibrated until the material is compacted in the tube to said fixed level.

3. The apparatus according to claim 2 wherein said means for passing air into said material comprises a source of pressurized air, pressure sensitive transducer producing signal at predetermined pressure levels, and a regulating valve for feeding said air simultaneously to said container and said transducer, and control means for initiating and stopping flow of air and for effecting the preceding and subsequent compacting and time measurement dependent thereon.

4. The apparatus according to claim 2 wherein said container is a transparent tube and said sensing means comprises a photo cell and light source.

5. The apparatus according to claim 2 wherein said scale comprises a pivotal arm on which said vibrator and container are mounted, and includes means for adjustably balancing said arm to a predetermined degree.

6. The apparatus according to claim 5 wherein said arm is mounted about a rotatable shaft and includes means for rotating said shaft to invert said tube located thereon.

7. The apparatus according to claim 3 including a predetermined quantity and volume of material, conduit means connecting said predetermined quantity and volume of material to said source of air, said control means including means for measuring said predetermined quantity and volume of material and for calibrating said scale and pressure sensitive transducer.

8. The apparatus according to claim 3 including means for cyclically operating said apparatus.

9. The apparatus according to claim 6 including means for cleaning said tube upon rotation of said arm.

* * * * *